United States Patent [19]

Mutou et al.

[11] Patent Number: 4,980,883
[45] Date of Patent: Dec. 25, 1990

[54] DISK TRAY

[75] Inventors: Kouichi Mutou, Chigasaki; Masae Murata, Yamato, both of Japan

[73] Assignee: Victor Company of Japan, Ltd., Yokohama, Japan

[21] Appl. No.: 426,780

[22] Filed: Oct. 26, 1989

[30] Foreign Application Priority Data

Oct. 26, 1988 [JP] Japan ................................ 63-139785

[51] Int. Cl.⁵ ........................ G11B 7/26; G11B 23/03
[52] U.S. Cl. .................................. 369/291; 369/77.1; 360/133
[58] Field of Search ................ 369/291; 360/133, 132; 206/444

[56] References Cited

U.S. PATENT DOCUMENTS

| | | | |
|---|---|---|---|
| 4,463,850 | 8/1984 | Gorog | 360/133 |
| 4,785,370 | 11/1988 | Ashe et al. | 360/133 |
| 4,800,554 | 1/1989 | Yamasaki et al. | |
| 4,829,504 | 5/1989 | Sunaga et al. | |

Primary Examiner—Stuart S. Levy
Assistant Examiner—Kenneth B. Wells
Attorney, Agent, or Firm—Fleit, Jacobson, Cohn, Price, Holman & Stern

[57] ABSTRACT

A tray for supporting a recording disk in a disk cassette has a pair of diametrically opposed pivoted levers with operative ends which engage opposite sides of the disk to hold it in the tray. The other end of each lever covers a pin insertion hole in the disk. When respective pins of a playback device are inserted through the insertion holes, the pins push against the levers and cause them to release the disk.

7 Claims, 3 Drawing Sheets

DISK TRAY

BACKGROUND OF THE INVENTION

The present invention relates to a disk tray to carry disks used in audio or video playback devices, and more particularly relates to a disk tray suitable for carrying compact disks.

Known in the art for the continuous and automatic playback of a plural number of disks, is an automatic disk playback device (such as U.S. Pat. No. 4,800,554) that uses a combination of an automatic disk playback device and a disk magazine which comprises a disk casing and a plural number of disk trays housed in the disk casing.

A disk tray is made using a single disk plate and has a substantially circular recess formed in it in order to house and support a disk. In addition, the disk casing is a box shape that has its front surface open and the inner walls of both sides having a plural number of parallel ribs forming multiple steps in order to stack and house a plural number of disk trays.

A disk is inserted into the disk tray housed in the disk housing portion and carried, and both sides of the disk trays are inserted between the inner ribs of the disk casing so that the disk trays are slidably supported and housed inside the disk casing.

In the case of large-diameter disks (such as 12 cm disks) where the disk carried in the disk tray have their circumferential edges close to both sides of the disk tray, when the disk trays are inserted into the disk casing, part of the circumferential edge of the disk is held between the disk casing inner ribs immediately above and beneath so that the disk tray cannot fall out when the disk magazine is handled or transported.

However, when small-diameter disks (such as 8 cm disks) are used, the circumferential edge of the disks inserted into the disk trays do not reach to between the inner ribs when the disk trays are inserted into the disk casing and so the disks cannot be held between the ribs above and beneath. Because of this, there is a problem that small-diameter disks may fall out of the disk trays when the disk magazine is handled or transported.

SUMMARY OF THE INVENTION

Accordingly, one of the objectives of the present invention is to provide a disk tray that enables even small disks to be carried securely.

According to the present invention, a disk tray comprises a tray plate having a disk housing portion for housing the disk, the tray plate being provided with pin insertion holes into which guide pins of a playback apparatus for positioning the disk tray therein are inserted, a first disk supporting means provided on the tray plate for supporting the disk horizontally on the disk tray, a second disk supporting means for supporting the disk vertically on the disk tray, comprising a pair of elongated members each of which is pivotted to the tray plate so as to swing substantially parallel to the tray plate and has a long arm portion and a short arm portion with respect to a pivotted position of the elongated member, the short arm portion of the pair of the elongated members respectively and partially cover the pin insertion holes when the disk tray is not loaded in the playback apparatus.

BRIEF DESCRIPTION OF THE DRAWINGS

FIG. 1 is an exploded perspective view showing a disk magazine including a disk tray of the present invention.

FIG. 2 is a plan view indicating the underside of the disk tray of the present invention.

FIG. 3 is a plan view indicating the top side of the disk tray of the present invention.

DESCRIPTION OF THE PREFERRED EMBODIMENTS

Figure 1:
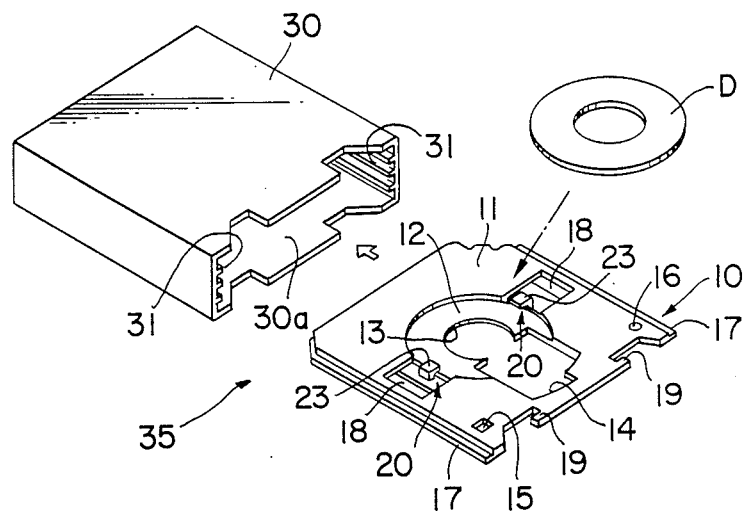
FIG. 1 through FIG. 3 are views showing a first embodiment of the present invention.

FIG. 1 shows a disk tray according to a first embodiment of the present invention. A disk tray 10 has a single tray plate 11 made of plastic, and this tray plate 11 is provided with a disk housing portion 12 in which a circular recessed portion is defined to house and support a disk D for restricting a horizontal movement of the disk D. The disk housing portion 12 has a central hole 13 formed coaxially at its center. Furthermore, the tray plate 11 is provided with an opening 14 which is continuous with the central hole 13 and through which opening 14, an optical pickup means of a playback device protrudes to pickup signals recorded on the disk D. In addition, the tray plate 11 is provided with two pin insertion holes 15 and 16 into which guide pins of the playback device for positioning the disk tray 10 are inserted and which are respectively located on opposite sides of the opening 14 at positions close to both sides 17 of the tray plate 11, as will be described in more detail later.

The disk tray 10 according to the present invention is provided with a disk holding device 20 and a pair of rectangular openings 18 formed at positions adjacent to the disk housing portion 12 of the tray plate 11 and, through the pair of rectangular openings 18, the disk holding device 20 partially protrudes to the upper surface of the tray plate 11. In addition, the front end portion of the tray plate 11 is provided with a pull-out arm 19 to pull out the disk tray 10 out of a disk casing 30.

Figure 2A:
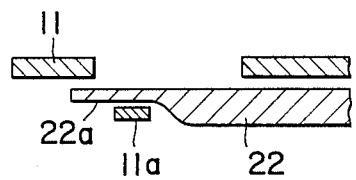
FIG. 2A is a partial cross-section taken along line A—A of FIG. 2.
Figure 2:
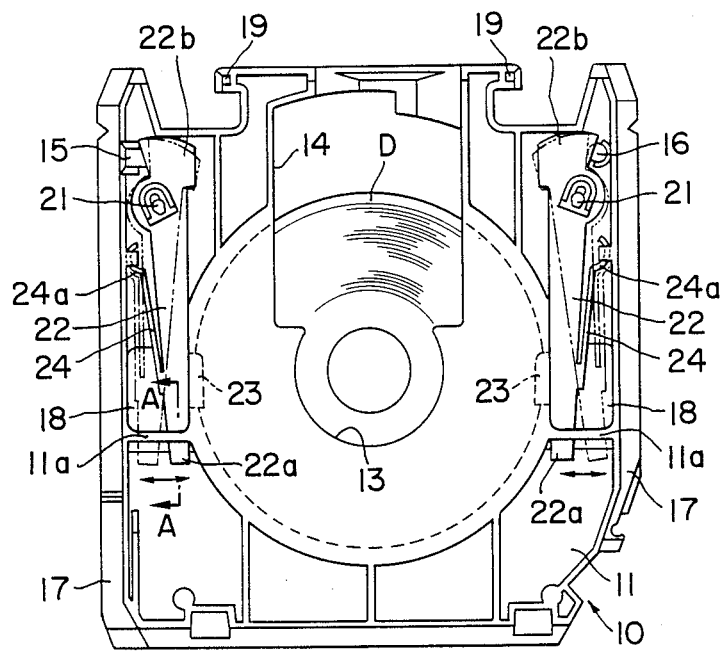
Figure 3:
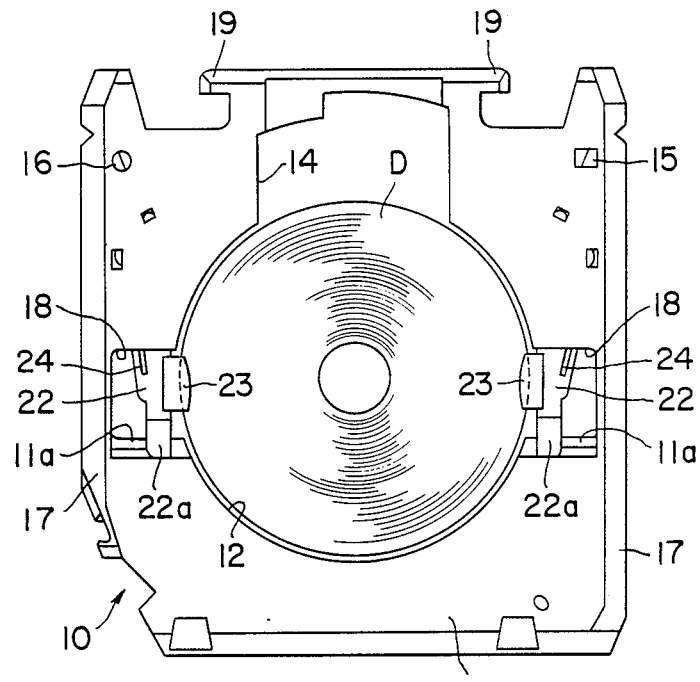

FIG. 2 and FIG. 3 are views showing the underside of the disk tray 10 and the top side of the disk tray 10, respectively. At a position adjacent to the two pin insertion holes 15 and 16 on the underside of the tray plate 11 are respectively fixed pins 21. The disk holding device 20 comprises a pair of rocker plates 22 pivotally supported respectively by the fixed pins 21, so that the rocker plates 22 are allowed to rock substantially parallel to the surface of the tray plate 11. Each of the rocker plates 22 is provided with a hook 23 for holding the disk D vertically i.e. in the axial direction of the disk D. The hook 23 is formed as an integral part of the rocker plate 22 and extends toward the center of the disk housing portion 12 through the rectangular opening 18. When a pair of the rocker plates 22 rocks toward the center of the tray plate 11 hooks 23 move to positions where they hang over a rim of the disk housing portion 12 and concurrently root portions 22b of the respective rocker plates 22 counterswing to positions where they partially cover the two pin insertion holes 15 and 16.

The rocker plate 22 is made of flexible plastic and has a spring member 24 formed as an integral part thereof and extending along the length of the rocker plate 22. The end portion 24a of the spring member 24 is fixed to each of the sides 17 of the tray plate 11. Due to this arrangement, each of the rocker plates 22 is biased toward the central hole 13 so that an end portion 22a of the rocker plate 22 swings around the center of pin 21 in the direction toward the center of the disk housing portion 12. In addition, the underside of the tray plate 11 is provided with ribs 11a formed with spaces made between the bottom surface of the tray plate 11 where the rocker plate 22 is mounted and the top surface of the ribs 11a so that the end portion 22a of the rocker plate 22 is respectively inserted between these ribs 11a and the underside of the tray plate 11 as shown in FIG. 7 and a swinging movement of the rocker plate 22 is limited by an outer fringe of the recessed disk housing portion 12.

As shown in FIG. 2 and FIG. 3, the tray plate 11 is provided with two pin insertion holes 15 and 16 into which positioning guide pins of the playback device are inserted when the tray plate is loaded to the device. One of the pin insertion holes namely the 15 is elongate so that the disk tray can precisely be seated in the playback device even if there is some production error in the pitch of the two holes 15 and 16.

In a disk tray 10 having a structure such as this, before the disk tray 10 is loaded in the playback device, the rocker plates 22 are biased by the spring member 24 in the direction toward the center of the disk housing portion 12, as shown by the solid line in FIG. 2, and the hook 23 of the rocker plates 22 positioned so that they partially hang over the disk housing portion 12 as well as a rim of a disk D housed in this disk housing portion 12. Accordingly, the disk D is limited from movement in the axial direction thereof and therefore does not fall out of the disk housing portion 12 when the disk tray 10 is handled.

It should be noted that a horizontal movement of the housed disk D is restricted by the recessed disk housing portion 12, and not by the pair of hooks 23.

In addition, the root portions 22b of the rocker plates 22 are in the status where they respectively and partially cover the two pin insertion holes 15 and 16, as shown in FIG. 2 and FIG. 3.

The disk tray 10 in which the disk D is housed, is inserted into the disk casing 30, as shown in FIG. 1. The disk casing 30 is a box shape with an opening 30a formed at its front end portion, and the side walls thereof are provided with a plural number of ribs 31 forming a plural number of parallel steps. The disk tray 10 is held between upper and lower ribs 31 at both sides 17 of the tray plate 11, as it is slidably inserted to be housed in the disk casing 30.

Figure 4:
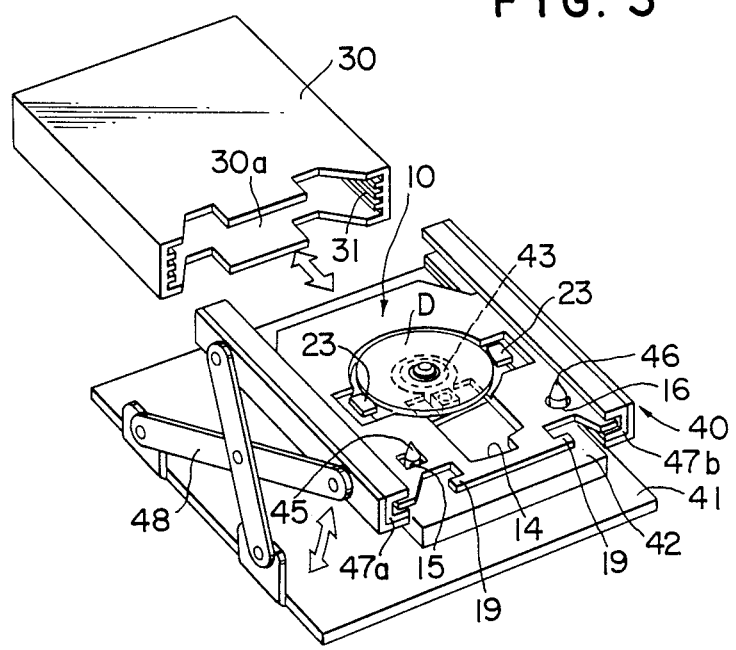
FIG. 4 is a perspective view indicating a state where the disk tray of the present invention is set in a playback device.

The disk magazine 35 is formed of a plural number of disk trays 10 housed in the disk casing 30, and this disk magazine 35 is set in the playback device. Once the disk magazine 35 is set in the playback device, the disk trays 10 are automatically and sequentially pulled out in accordance with a predetermined program and the disks D are played back. The following is a description of an operation sequence, given with reference to FIG. 4.

The playback device 40 has a base plate 42 mounted on a bottom plate 41 and mounted to this base plate 42 are several components for playing back the signals recorded on the disk D. This is to say that at substantially the center of the base plate 42 is disposed a turntable 43 to support and rotate the disk D, and a driving motor (not indicated in the figure) interconnected to the turntable 43.

Disposed at a position adjacent to the turntable 43 is an optical pickup device (not shown in the figure) and this optical pickup device has a structure whereby it passes through the opening 14 in the disk tray 10 to extend to a position above the disk D. In addition, both of the sides of the base plate 42 are provided with guide pins 45 and 46 having conical top portions.

At a position above both sides of the base plate 42 are provided a pair of parallel guide rails 47a and 47b. These guide rails 47a and 47b are supported by an elevator mechanism 48 respectively mounted on the bottom plate 41.

When the disk magazine 35 is set in the playback device 40, the opening 30a of the disk casing 30 is oriented to oppose the turntable 43. The elevator mechanism 48 adjusts the height of the guide rails 47a and 47b to align them with the disk tray 10 in which the disk D selected to playback is housed. A clamper (not indicated in the figure) clamps the pull-out arm 19 of the disk tray 10 and the disk tray 10 is pulled out of the disk casing 30 and introduced between the guide rails 47a and 47b with the sides 17 being seated therein.

The elevator mechanism 48 lowers the guide rails 47a and 47b together with the disk tray 10, which in turn stops when the guide pins 45 and 46 of the base plate 42 are inserted into the two pin insertion holes 15 and 16.

When the guide pins 45 and 46 are inserted into the two pin insertion holes 15 and 16, the two guide pins 45 and 46 having a conical top pushes away the root portions 22b of the rocker plates 22 causing the rocker plates 22 to move against the spring force of the spring member 24 to the position indicated by the double-dotted line of FIG. 2, as a result the hooks 23 releases the disk D.

Then, the turntable 43 rises through the central hole 13 to receive the disk D to be mounted thereon. Then, the turntable 43 rotates and the optical pickup device operates to play back the disk D.

When playback has been completed, the processes that have been described above for handling the disk tray 10 in the disk casing 30 are performed in reverse. This is to say that the turntable 43 lowers and the disk D is seated into the disk housing portion 12 of the disk tray 10. Then, the elevator mechanism 48 raises the guide rails 47a and 47b together with the disk tray 10 to align it with a slot of the disk casing 30 where it was originally housed. When the disk tray 10 rises along with the guide rails 47a and 47b, the guide pins 45 and 46 are pulled out of the two pin insertion holes 15 and 16. With this, the rocker plates 22 returns by the spring force of the spring member 24 so that the hooks 23 hold the outer circumference of the disk D.

In this manner, according to this embodiment of the present invention, the disk D housed in the disk tray 10 has its movement in the axial direction of the disk D restricted by the rocker plate 22 so that the disk D does not come out of the disk tray 10 while it is being carried. In addition, when the disk tray 10 is loaded to the playback device 40, the guide pins 45 and 46 cause the rocker plates 22 to swing so that hooks 28 release the disk D. Accordingly, this embodiment of the present invention facilitates the automatic selection and playback of the small-diameter disks housed in the disk magazine.

Figure 5:
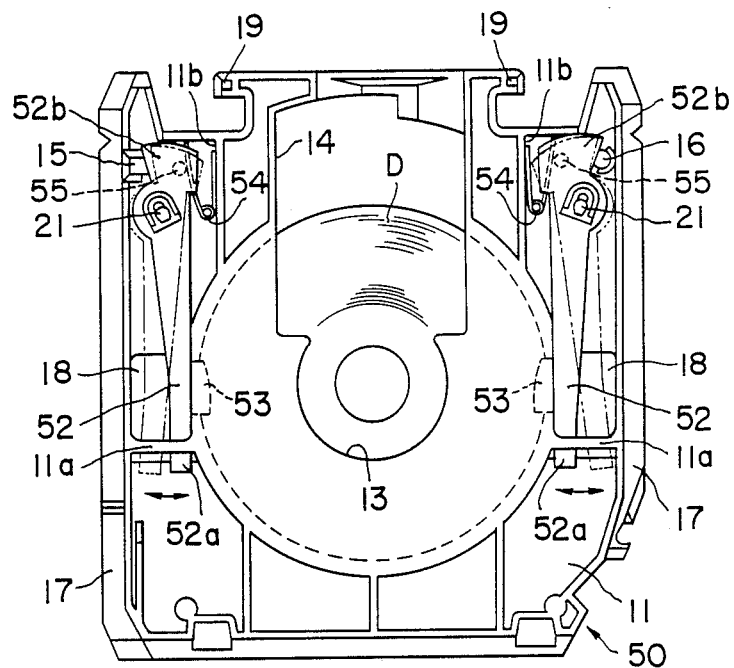
FIG. 5 is a plan view indicating the underside of a disk tray according to a second embodiment of the present invention.
Figure 6:
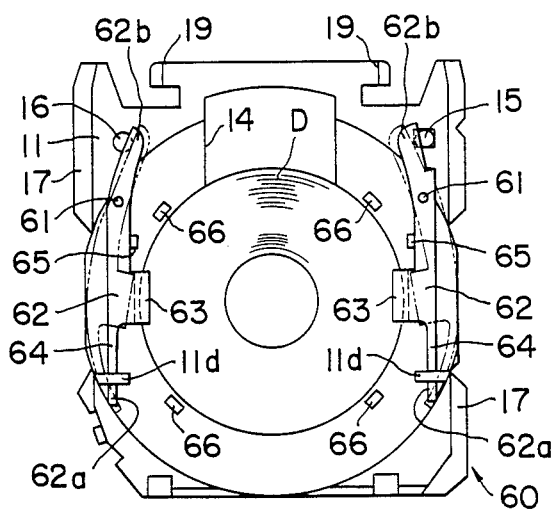
FIG. 6 is a plan view indicating the top side of a disk tray according to a third embodiment of the present invention.

FIG. 5 and FIG. 6 are views indicating a second and a third embodiment of the present invention, respectively.

In the embodiment indicated in FIG. 5, the spring member for moving the rocker plate has a different structure. The other parts of the configuration are the same as for the disk tray indicated in the previously described first embodiment and so the same numbers are used for similar parts, and the corresponding descriptions for them has been omitted.

The tray plate 11 of the disk tray 50 has a hook 53 that restricts the movement of the disk D in the vicinity of the leading edge portion 52a, and the root portion 52b is mounted so that the rocker plate 52 can rock around the center of pin 21. The underside (side of the tray plate 11) of the root portion 52b of the rocker plate 52 is provided with a projection 55 that projects toward the tray plate 11. In addition the underside of the tray plate 11 is formed with a side wall 11b perpendicular to the tray plate 11. Between this projection 55 and the side wall 11b is disposed a torsion spring 54 so that the spring force of the torsion spring 54 urges the hook 53 toward the center of the disk D so that the disk D is held in the disk housing portion 12 or released therefrom in the same manner as explained for the first embodiment.

In the embodiment indicated in FIG. 6, the disk restricting device is provided on the top side of the tray plate 11. The other parts of the configuration are the same as for the previously described first embodiment and so the same numbers are used for similar parts, and the corresponding descriptions for them has been omitted.

In this embodiment of the present invention, the holding device comprises a pair of elastic members 62 which are respectively provided with a hook 63 that can move to a position overhanging the circumference of the disk D so that vertical movement of the disk D is restricted thereby. Each of the elastic member 62 is mounted so that it rocks around the center of the pin 61 that projects from the tray plate 11, and the short arm end 62b of the elastic member 62 is disposed so that it partially covers the respective pin insertion holes 15 and 16. The long arm end 62a of the elastic member 62 is caught under the ribs 11d formed in the surface of the tray plate 11. On the surface of the tray plate 11 is additionally provided a stopper 65, which comes into contact with the intermediate portion of the elastic member 62, and so that the elastic member 62 does not go too far towards the center of the disk D. In addition, in this embodiment of the present invention, the top surface of the tray plate 11 is provided with four projections 66 and the area encircled by these projections 66 forms a housing portion that houses the disk D so that horizontal movement of the disk D is restricted on the tray plate 11.

A thin elongated portion 64 of the elastic member 62 serves as a spring member to urge the hook 63 toward the center of the disk D for holding the disk D in the circumvented area. Accordingly, when the disk tray 60 is loaded into a playback device, the short arm end 62b is pushed by the pin 46 causing the hook 63 retracted from the circumference of the disk D as the thin elongated portion 64 flexes in response to the rocking motion of the elastic member 62 as shown by the double-dotted line in the same figure. This releases the disk D from its restriction.

As has been described above, according to the present invention, even disks with small diameters can be securely housed and supported in a disk tray without the possibility of them falling out. In addition, the disk kept from falling out can be automatically released when the disk tray is loaded into a playback device for playback. Accordingly, the disk tray according to the present invention provides an excellent function when applied to disk magazines used for the selective and automatic playback of a plural number of disks.

We claim:

1. A disk tray for holding a disk therein, comprising: a substantially planar tray plate having a disk housing portion for housing the disk, said tray plate being provided with pin insertion holes outwardly of the disk housing portion into which guide pins of a playback apparatus for positioning the disk tray therein can be inserted in a direction substantially perpendicular to the plane of the plate, a first disk supporting means provided on the tray plate for supporting the disk on the disk tray in the plane of the plate, a second disk supporting means for releasably supporting the disk on the disk tray in a direction perpendicular to the plane of the plate, the second means, comprising a pair of elongated members each of which is pivoted to the tray plate so as to swing substantially parallel to the plane of the plate and has a long arm portion and a short arm portion with respect to a pivoted position of the elongated member, said short arm portion of each of the pair of elongated members at least partially covering a respective one of said pin insertion holes when a long arm portion of the respective elongated member supports the disk in said direction, and the short arm portion being movable by a guide pin when the guide pin is inserted in the respective hole to release the long arm portion from the disk.

2. The disk tray of claim 1, wherein said first disk supporting means is a recess formed at said disk housing portion, and said long arm portion of each elongated member has hook means extending toward a center of said recess so that said disk is supported in the recess horizontally and vertically when the disk tray is not loaded in the playback apparatus.

3. The disk tray of claim 1, wherein said first supporting means comprises a plurality of projections provided on the tray plate encircling and defining said disk housing portion.

4. The disk tray of claim 1, wherein said pair of elongated members is biased toward a center of the disk housing portion by elastic means.

5. The disk tray of claim 4, wherein said elastic means is a spring member formed integrally with each of the elongated members, and extending along said each of the elongated members.

6. The disk tray of claim 4, wherein said elastic means is a torsion spring coupled between each of said short arm portion of the pair of elongated members and the tray plate.

7. The disk tray of claim 5, wherein said elastic means is a thin elongated portion formed as a part of said long arm portion of the elongated member.

* * * * *